United States Patent
Lin

(10) Patent No.: US 8,347,975 B2
(45) Date of Patent: Jan. 8, 2013

(54) CULTIVATOR

(76) Inventor: Huang-Lung Lin, Puyan Township, Changhua County (TW)

( * ) Notice: Subject to any disclaimer, the term of this patent is extended or adjusted under 35 U.S.C. 154(b) by 97 days.

(21) Appl. No.: 13/012,026

(22) Filed: Jan. 24, 2011

(65) Prior Publication Data

US 2012/0186839 A1    Jul. 26, 2012

(51) Int. Cl.
*A01B 1/00* (2006.01)
(52) U.S. Cl. .......................... 172/378; 172/25
(58) Field of Classification Search .................. 172/21, 172/371, 374, 378, 25; 403/66, 93, 341
See application file for complete search history.

(56) References Cited

U.S. PATENT DOCUMENTS

| | | | | |
|---|---|---|---|---|
| 252,738 A * | 1/1882 | Chesbro | ...... | 15/104.05 |
| 256,039 A * | 4/1882 | Peters | ...... | 175/320 |
| D31,896 S * | 11/1899 | Swartz | ...... | D8/13 |
| 1,202,772 A * | 10/1916 | Baird | ...... | 172/371 |
| 1,945,430 A * | 1/1934 | Garrett | ...... | 403/66 |
| 2,082,476 A * | 6/1937 | Allen | ...... | 172/25 |
| 2,487,696 A * | 11/1949 | Coffing | ...... | 403/4 |
| 2,787,491 A * | 4/1957 | Roberts | ...... | 294/51 |
| 3,960,218 A * | 6/1976 | Atchley et al. | ...... | 172/13 |
| 4,905,768 A * | 3/1990 | Lorenz | ...... | 172/25 |
| 5,207,466 A * | 5/1993 | Ohlson | ...... | 294/61 |
| 5,706,900 A * | 1/1998 | Liao | ...... | 172/378 |
| 5,709,273 A * | 1/1998 | Roth | ...... | 172/22 |
| D406,219 S * | 3/1999 | Basek | ...... | D8/13 |
| 6,843,324 B2 * | 1/2005 | Basek | ...... | 172/378 |
| 7,347,276 B2 * | 3/2008 | Basek | ...... | 172/25 |
| D579,738 S * | 11/2008 | Karczewski | ...... | D8/7 |
| D586,632 S * | 2/2009 | Lai | ...... | D8/6 |
| 8,047,300 B1 * | 11/2011 | Lin | ...... | 172/349 |
| D657,212 S * | 4/2012 | Pare et al. | ...... | D8/8 |

* cited by examiner

*Primary Examiner* — Jamie L McGowan
(74) *Attorney, Agent, or Firm* — Ming Chow; Sinorica, LLC

(57) ABSTRACT

A cultivator includes an operation rod, a handle, a base, and a plurality of claw members. The operation rod has a rotating central axle. The handle is disposed on one end of the operation rod. The base is fixed to another end of the operation rod. The base has non-circle connecting troughs at a circumferential portion thereof. Each of the connecting troughs has vertical connecting surfaces therein. Each claw member has a vertical connecting block and a claw portion. The connecting block has a non-circle cross-section. The connecting block has vertical mating surfaces on outer sides thereof. The connecting block is inserted in the connecting trough. The matching surfaces are vertically engaged with the connecting surfaces and confined by the connecting surfaces. The connecting block is coupled at a predetermined angle. The claw members are disposed in an oblique and curve form.

10 Claims, 6 Drawing Sheets

CULTIVATOR

BACKGROUND OF THE INVENTION

1. Field of the Invention

The present invention relates to a gardening hand tool, and more particularly to a cultivator.

2. Description of the Prior Art

A conventional cultivator has a rod and a plurality of claws disposed at the distal end of the rod. The claw has a base and a claw portion. The distal end of the base is fixed to the rod. The claw portion extends downward from another end of the base. When in use, the claw portion faces the ground and the rod is rotated to turn the claw portion so as to cultivate earth.

The conventional cultivator has the claw portion parallel to the axle of the rod. When a down force is applied, the rod will get contact with the ground direct. The user has to get enough strength to conquer the action force of the ground for the claw portion to be inserted in the ground. Sometimes, the user has to press the claw portion into the ground by his/her foot. Because the claw portion is perpendicular to the ground, the claw portion must be contact with the ground direct when the claw portion is turned. It is not easy to transform the applying force. The claw portion is direct pressed to the ground, and the side earth is not cultivated. It is necessary to apply a great force for turning the claw portion. This operation is laborious.

SUMMARY OF THE INVENTION

The primary object of the present invention is to provide a cultivator which comprises an operation rod, a handle, a base, and a plurality of claw members. The operation rod has a rotating central axle. The handle is disposed on one end of the operation rod. The base is fixed to another end of the operation rod. The base has non-circle connecting troughs at a circumferential portion thereof. Each of the connecting troughs has vertical connecting surfaces therein. Each claw member has a vertical connecting block and a claw portion. The connecting block has a non-circle cross-section. The connecting block has vertical mating surfaces on outer sides thereof. The connecting block is inserted in the connecting trough. The matching surfaces are vertically engaged with the connecting surfaces and confined by the connecting surfaces. The connecting block is coupled at a predetermined angle. The claw members are disposed in an oblique and curve form.

The connecting block of the claw member according to the cultivator of the present invention is coupled in the connecting trough at a predetermined angle, such that the claw members are confined by the base. When the cultivator is operated, the claw portion will have a side action. When the user grasps the handle and applies a down force to the operation rod, the claw portion of the claw member will generate a side force. The claw portion 42 is obliquely guided into the ground, not direct contact with the ground. The claw portion is obliquely guided into the ground cultivate earth, which can be turned easily.

DETAILED DESCRIPTION OF THE PREFERRED EMBODIMENTS

Embodiments of the present invention will now be described, by way of example only, with reference to the accompanying drawings.

Figure 1:
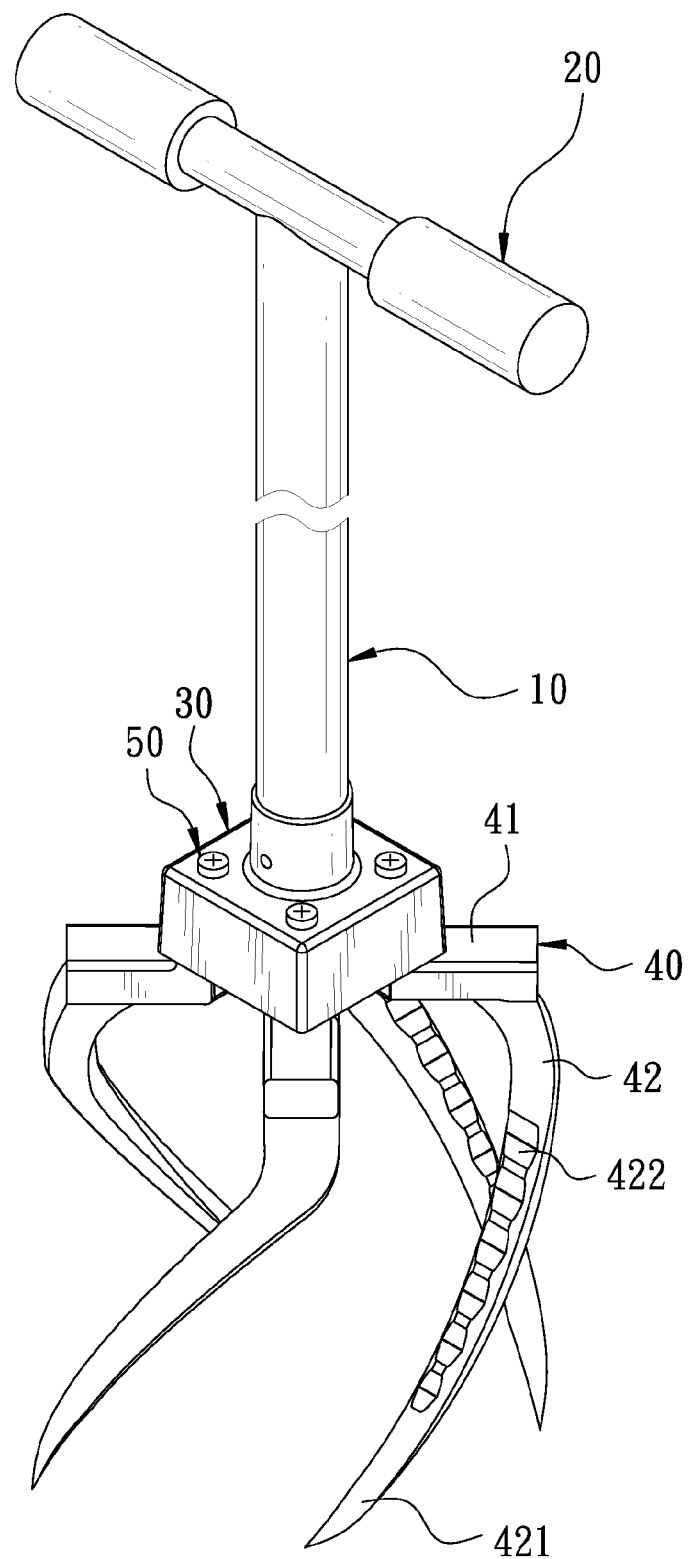
FIG. 1 is a perspective view according to a preferred embodiment of the present invention.
Figure 2:
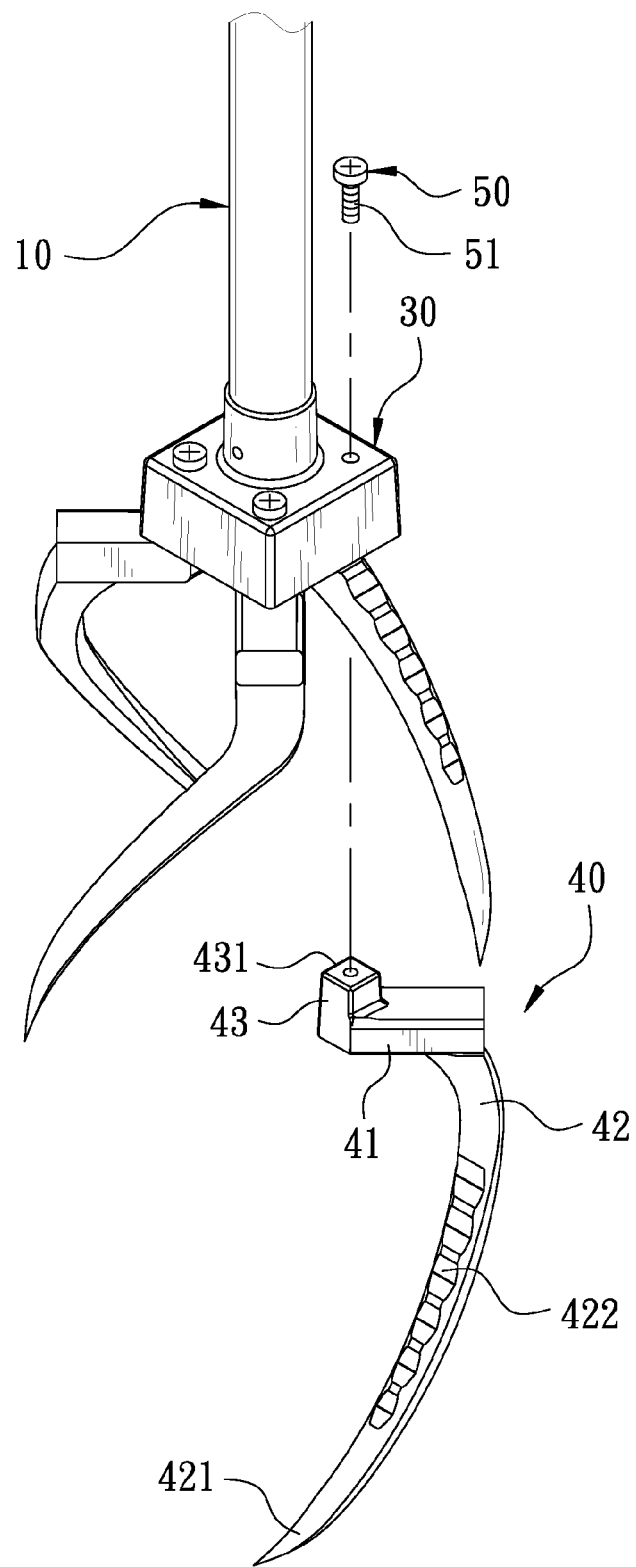
FIG. 2 is a partial exploded view according to the preferred embodiment of the present invention.
Figure 3:
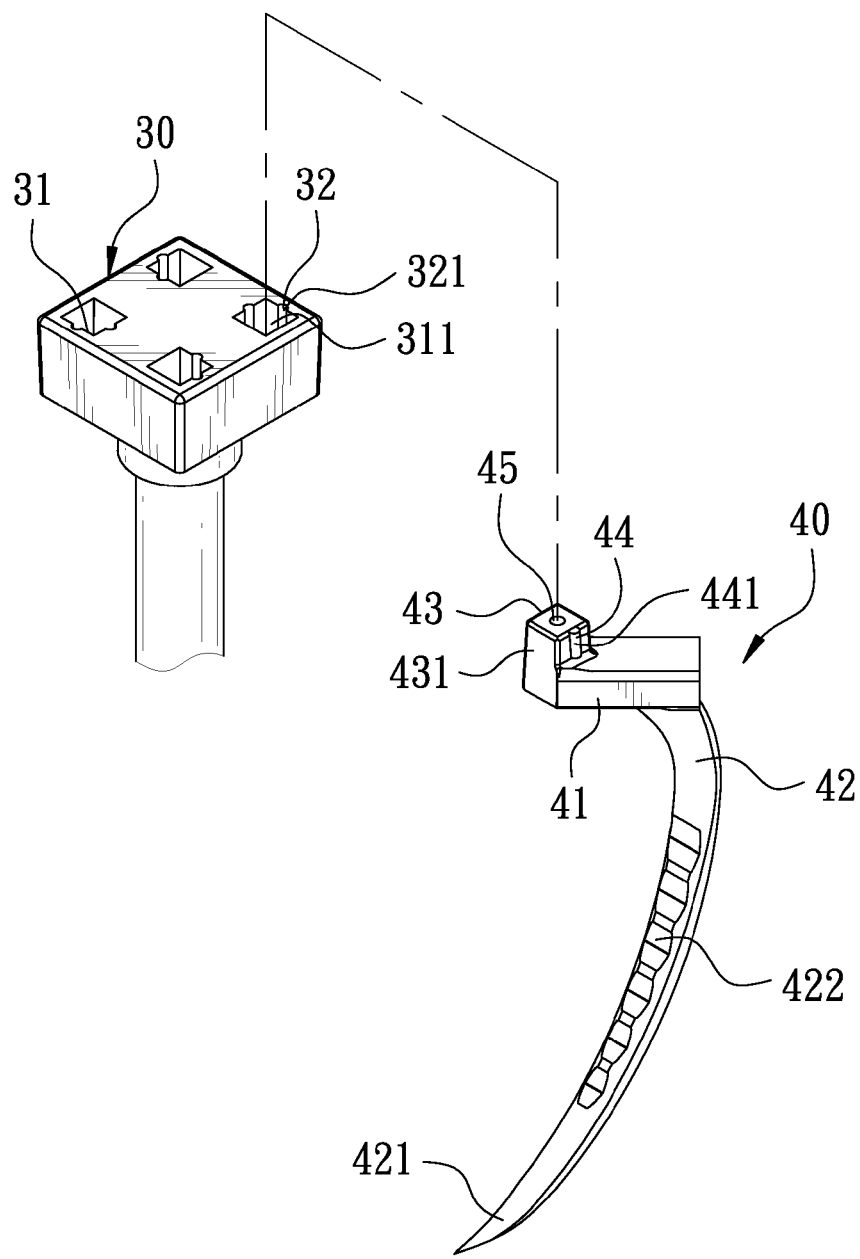
FIG. 3 is a schematic view according to the preferred embodiment of the present invention.

As shown in FIG. 1 and FIG. 2, a cultivator according to a preferred embodiment of the present invention comprises an operation rod 10, a handle 20, a base 30, and a plurality of claw members 40.

The operation rod 10 has a rotating central axle.

The handle 20 is disposed on one end of the operation rod 10.

The base 30 is fixed to another end of the operation rod 10. The base 30 has a bottom formed with four non-circle connecting troughs 31.

Figure 4:
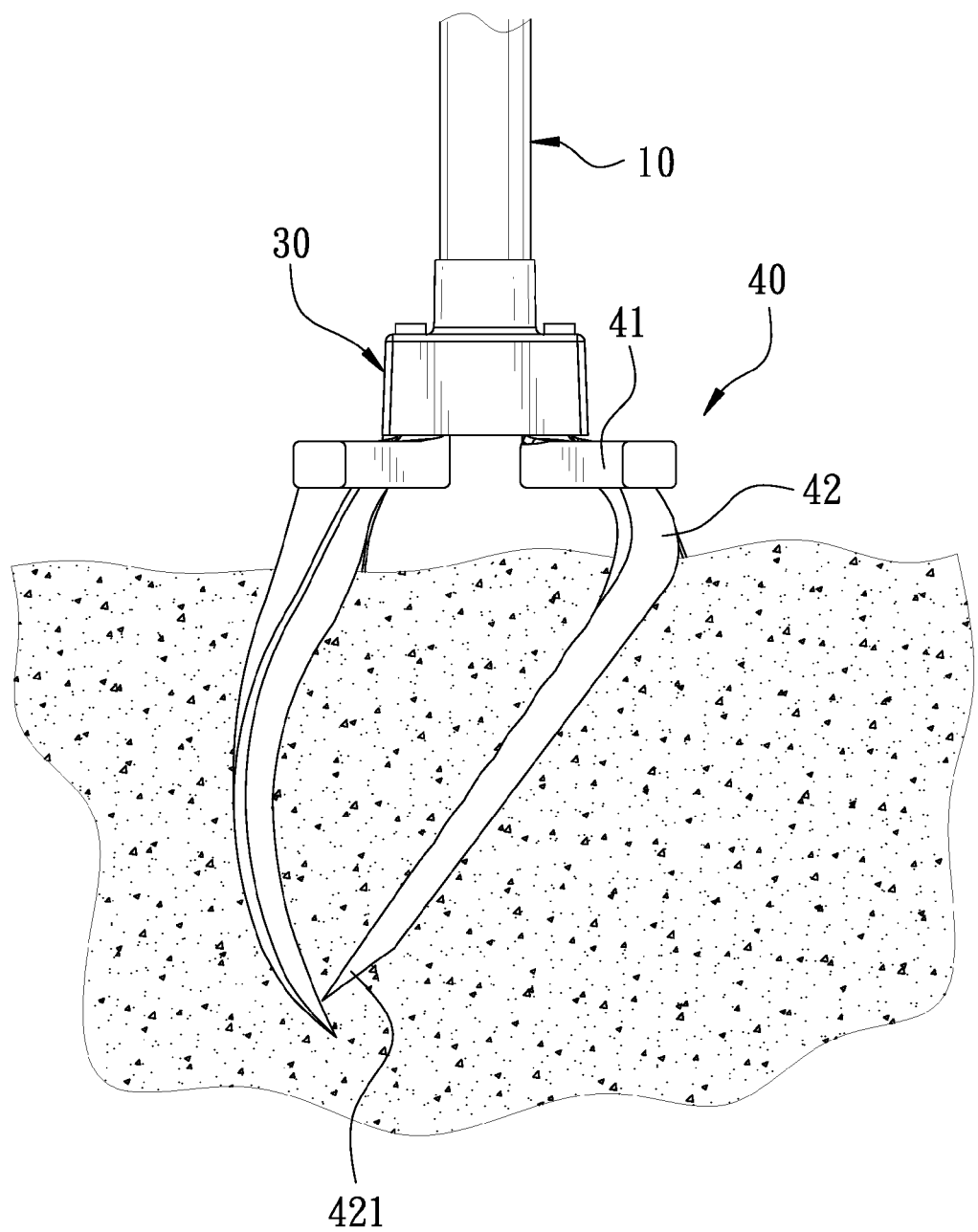
FIG. 4 is a schematic view according to the preferred embodiment of the present invention when in use.

In this embodiment, the connecting trough 31 has a quadrilateral shape. The connecting troughs 31 are disposed at four corners of the bottom of the base 30. The connection troughs 31 may have a water drop shape or an equilateral shape. Each connecting trough 31 has vertical connecting surfaces 311. Referring to FIG. 4, two of the connecting surfaces 311 of the connecting trough 31 each have a first limit portion 32 which is a limit groove 321. The limit groove 321 forms a taper surface. Furthermore, the base 30 has a through hole 33 on a top of each of the connecting troughs 31.

Each claw member 40 has an arm portion 41 and a claw portion 42. One side of the arm portion 41 has a connecting block 43. In this embodiment, the connecting block 43 has a quadrangle shape corresponding to the connecting trough 31. The connecting block 43 has vertical mating surfaces 431 corresponding to the connecting surfaces 311. The mating surfaces 431 also form taper surfaces. Referring to FIG. 4, the mating surfaces 431 of the connecting block 43 has a second limit portion 44 corresponding to the limit groove 321 of the first limit portion 32. The second limit portion 44 is a limit protrusion 441 which is selectively inserted in the limit groove 321. The claw portion 42 is disposed at a distal end of the arm portion 41 away from the connecting block 43. The claw portion 42 is disposed in the form of a spiral curve. The claw portion 42 has a guide awl 421 at a distal end thereof. An upper side of the claw portion 42 has a plurality of concaves 422. The connecting block 43 has a top surface formed with a threaded hole 45. The threaded hole 45 corresponds in position to the through hole 33. A fastener 50 is inserted in the through hole 33 and the threaded hole 45 to secure the claw member 40. In this embodiment, the fastener 50 is a screw 51.

In order to understand the feature, technique and expected efficacy of the present invention, the detailed use of the present invention is described hereinafter.

FIG. 4 is a schematic view of the cultivator of the present invention when in use. The user grasps the handle 20 and applies a down force. The down force is sent to the claw members 40 through the operation rod 10 and the base 30. The guide awl 421 has a smaller contact area, which can be pushed into the ground with ease. The claw portion 42 is obliquely arranged, so a part of the down force is transferred into a side force and the claw portion 42 is obliquely guided into the ground, not direct contact with the ground. The ground is piled up by several layers, so its side action is lower and the claw portion 42 can be guided into the ground easily. The claw portion 42 is guided into the ground in a spiral way. When the claw portion 42 is inserted into the ground, the ground will have a transverse hole and the distal end of the guided claw portion 42 will approach the top end of another claw portion 42. All the claw portions 42 are guided into the ground within the rotation radius. Then, the user further applies a force on the handle 20 to turn the operation rod 10 and all the claw portions 42 are turned to cultivate earth within the rotation radius. The present invention can be operated conveniently and easily, without the need for much strength. Besides, the connection block 43 of the claw member 40 is connected to the connecting trough 31 with the matching surfaces 431 to engage with the connecting surfaces 311. When applying a force, the base 30 provides a limit function to the claw members 40 and the force is even sent to the claw members 40.

Figure 5:
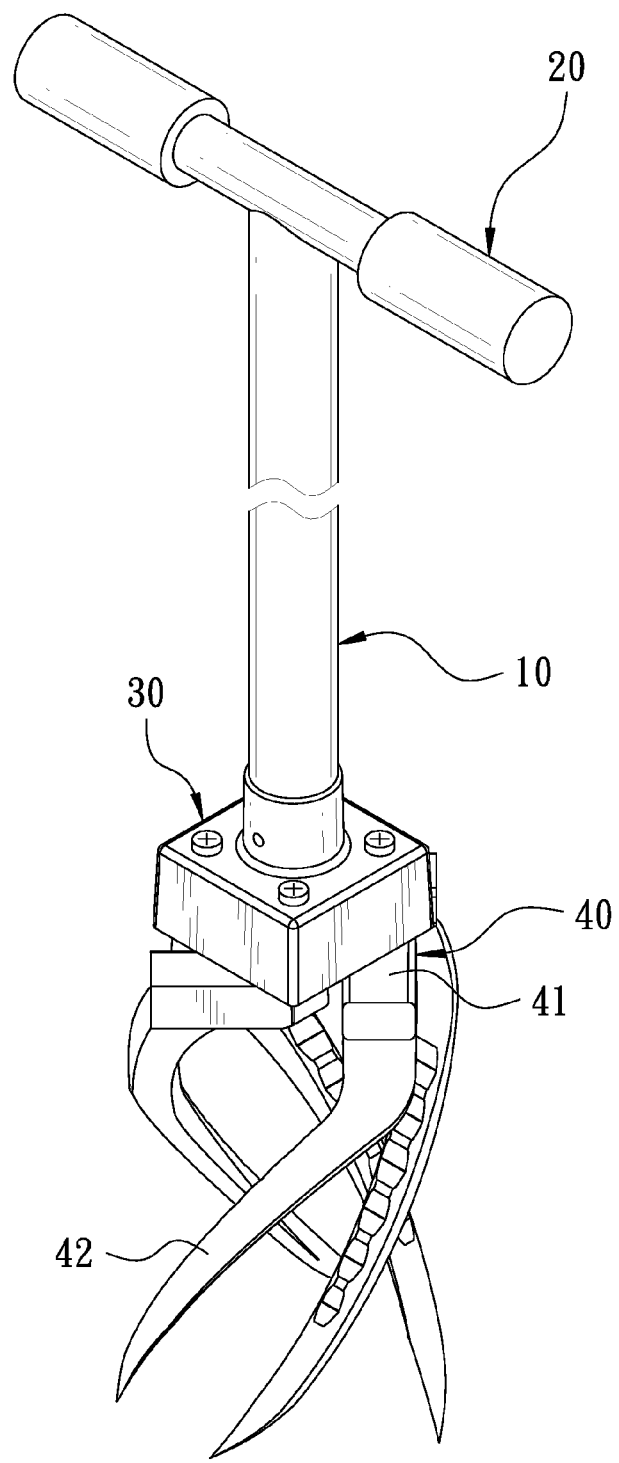
FIG. 5 is a schematic view according to the preferred embodiment of the present invention in another operating state.

Referring to FIG. 4, the claw member 40 of the present invention is connected to the base 30 with the connecting surfaces 431 of the connecting block 43 to engage with the connecting surfaces 311 of the connecting trough 31. Both the connecting trough 31 and the connecting block 43 are in a quadrangle shape, so the position of the connecting block 43 in the connecting trough 31 can be adjusted to change the direction of the claw member 40. By this change, the rotation radius of the claw members 43 can be adjusted, as shown in FIG. 1 and FIG. 5. Referring to FIG. 4, the first limit portion 32 of the connecting trough 31 is adapted to limit the connecting direction of the second limit portion 44 of the claw member 40, preventing the claw member 40 from being wrongly connected when in use.

Figure 6:
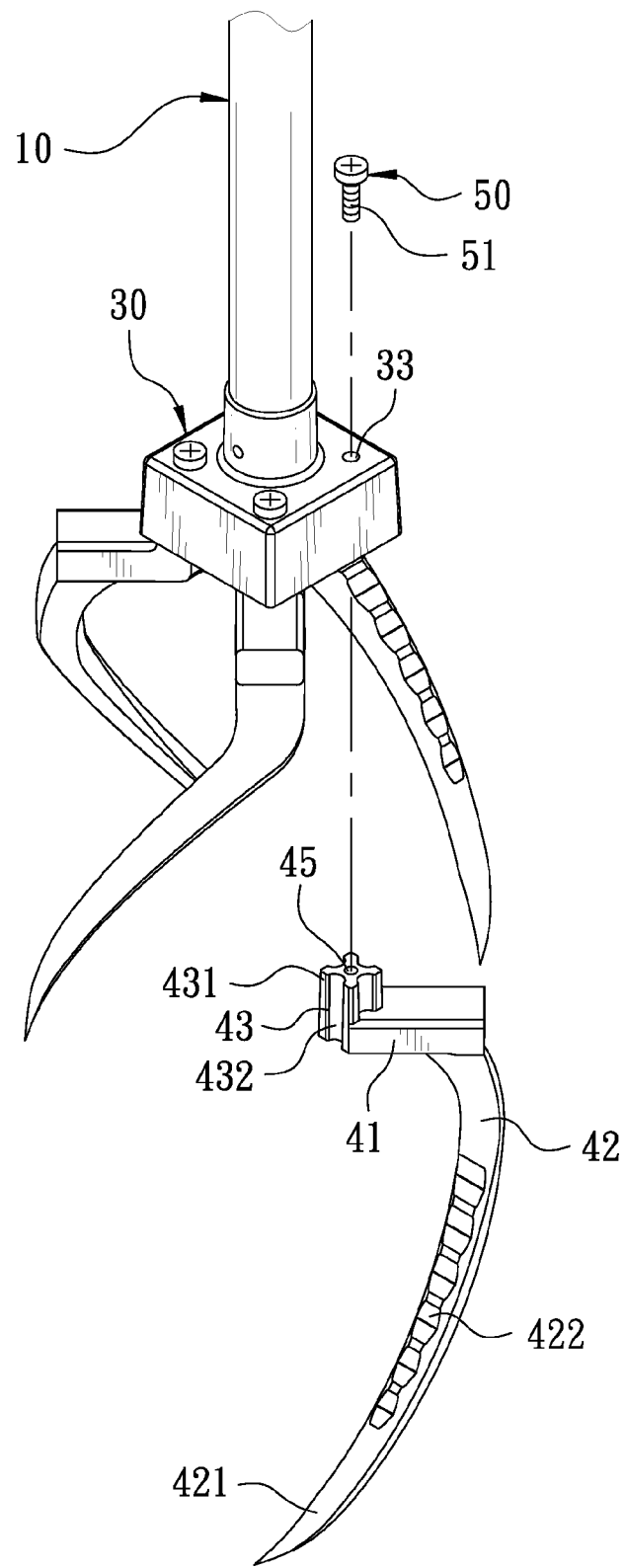
FIG. 6 is a perspective view according to another embodiment of the present invention.

FIG. 6 shows another embodiment of the present invention, which is substantially similar to the aforesaid embodiment with the exceptions described hereinafter. The matching surface 431 of the connecting block 43 of the claw member 40 has vertical grooves.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A cultivator, comprising:
   an operation rod having a rotating central axle;
   a handle disposed on one end of the operation rod;
   a base fixed to another end of the operation rod;
   the base having non-circle connecting troughs at a circumferential portion thereof;
   each of the connecting troughs having vertical connecting surfaces therein;
   a plurality of claw members;
   each of the plurality of claw members having a vertical connecting block and a claw portion;
   the connecting block having a non-circle cross-section;
   the connecting block has a polygon shape and each of the connecting trough has a corresponding polygon shape;
   the connecting block having vertical mating surfaces on outer sides thereof;
   the connecting block being inserted in the connecting trough;
   the mating surfaces being vertically connected to the connecting surfaces and confined by the connecting surfaces;
   the connecting block being coupled at a predetermined angle;
   the claw members being disposed in an oblique and curve form;
   each of the claw members has an arm portion between the connecting block and the claw portion;
   the connecting block is disposed at one end of the arm portion; and
   the claw portion is disposed at another end of the arm portion, wherein by connecting the vertical connecting blocks at different positions of the connecting troughs the claws pivoting around the operation rod with various coverage of operations.

2. The cultivator as claimed in claim 1, wherein the connecting block has a threaded hole, each of the connecting troughs has a through hole corresponding in position to the threaded hole, and a fastener is adapted to lock the through hole and the threaded hole.

3. The cultivator as claimed in claim 1, wherein the matching surfaces of the connecting block has at least one vertical groove.

4. The cultivator as claimed in claim 1, wherein the claw portion is disposed in the form of a spiral curve.

5. The cultivator as claimed in claim 1, wherein the connecting surfaces have at least one first limit portion, the mating surfaces have at least one second limit portion, and the second limit portion is selectively inserted in the first limit portion.

6. The cultivator as claimed in claim 5, wherein the first limit portion is a limit groove and the second limit portion is a limit protrusion.

7. The cultivator as claimed in claim 1, wherein an upper side of the claw portion has a plurality of concaves.

8. The cultivator as claimed in claim 1, wherein the claw portion has a guide awl at a distal end thereof.

9. The cultivator as claimed in claim 1, wherein the connecting surfaces of each of the connecting troughs form taper surfaces.

10. The cultivator as claimed in claim 9, wherein the mating surfaces of the connecting block form taper surfaces.

* * * * *